Patented Apr. 9, 1935

1,996,794

UNITED STATES PATENT OFFICE 1,996,794

WELDING ELECTRODE

John H. Deppeler, Weehawken, N. J.

No Drawing. Application July 18, 1933,
Serial No. 680,991

2 Claims. (Cl. 219—8)

This invention relates to electric arc welding; and it comprises an iron welding electrode of special composition and provided with a coating for shielding the welding metal from atmospheric action during the welding operation, the composition of the electrode within the coating shield including a carbon content between 0.2 and 0.3 per cent, said carbon content having the effect of producing a weld having high tensile strength and ductility without undue fluidity of the welding material under the arc temperature, the composition and structure of the welding electrode making it freely available for overhead and vertical welding operations as well as for flat work; all as more fully hereinafter set forth and as claimed.

Until recent years the arc welding of ordinary iron or steel such as flanging steel, boiler plate, ship plate, steel tanks, forgings, structural steel and the like, was usually done with bare electrodes made of soft iron or steel. A typical analysis of a soft steel bare welding rod is:

|  | Per cent |
|---|---|
| Carbon | 0.13 to 0.18 |
| Manganese | 0.4 to 0.6 |
| Phosphorus | 0.04 maximum |
| Sulfur | 0.04 maximum |
| Silicon | 0.06 maximum | the remainder of the metal being iron.

These bare electrodes were used with either direct or alternating current. They were almost equally useful for ordinary downhand welding, for welding vertical surfaces and for overhead work. These bare wire or rod electrodes accomplished their purpose in ordinary welding of iron and steel pieces but the deposited welding metal was not at all equal to the parent metal in its physical properties. The welds were often brittle, lacking tensile strength and ductility.

This lack of strength in the weld when using bare electrodes was found to be due principally to the absorption of oxygen and nitrogen from the atmosphere by the weld metal during the welding operation. The troublesome welding problems due to lack of weld strength experienced with the bare welding rods were solved by the invention of electrode coatings which shield the core metal, the metal passing through the arc and the freshly deposited metal of the weld from overoxidation and from nitridation by the air. The welds produced by use of coated electrodes exhibit tensile strengths and ductility which almost always equal the strength and ductility of the metal being welded and frequently far exceeds it. The coatings of this shielded type of electrode are of various compositions but are all designed to exclude oxygen and nitrogen from the weld metal.

As the coated electrode has come into general use, a new difficulty has arisen in that the weld metal is too fluid; that is to say, the melted electrode and the melted metal of the article being welded tend to flow away from the welding faces. The weld metal does not stick to the joint. This is serious enough in ordinary downhand flat welding but in vertical and overhead welding the undue fluidity of the welding metal is extremely troublesome and often makes the weld unsatisfactory. Failure of the weld often results.

Much research has been directed to overcoming the difficulty due to the great fluidity of the coated iron electrode in the arc. The core rod or wire in the coated electrodes is usually of the same composition as that given above for the old bare electrodes. And most attempts to produce a satisfactory coated electrode have been directed to reducing the thickness of the protective coatings and to changing the coating composition to make them more sluggish under the arc and more quickly congealing so that the melted coatings would stick without dragging or dripping and thus hold the welding metal. These attempts have failed for the most part because as the coatings are altered to produce more sluggish slags these slags become entrapped in the weld material and produced unsound welds.

In the present invention, I have succeeded in overcoming the difficulties experienced with coated electrodes. I have found that the too great fluidity of the coated electrode is prevented by a relatively minor change in the composition of the electrode core metal itself. The change in composition of the core metal consists essentially in increasing the carbon content of the metal. The result obtained is surprising because it is well known that as the carbon content of steel is increased its melting point is lowered and the fluidity increases. It would be expected that an increase in carbon content would make the weld more rather than less fluid. I have found however that when the core iron of coated or shielded arc electrodes contains from 0.20 per cent to 0.30 per cent of carbon, there is not only a great improvement in the welding action of such an electrode but also that sound welds of high tensile strength and excellent ductility are obtained. The fluidity of the welding metal under the arc is decreased instead of increased and overhead and vertical welding become entirely satisfactory.

A specific test was made with a coated electrode under the present invention, the core rod iron of which analyzed:

|  | Per cent |
|---|---|
| Carbon | 0.25 |
| Manganese | 0.67 |
| Silicon | less than 0.06 |
| Sulfur | less than 0.04 |
| Phosphorous | less than 0.04 |

Two steel plates were welded together in an overhead position, the plate material being a mild steel containing 0.12 per cent carbon. No difficulty was experienced in making the welding metal stick to the joint. The metal of the weld was afterwards tested and found to possess the following physical characteristics:

Specific gravity ........................... 7.85
Tensile strength .... 71,500 pounds per square inch
Elongation in 2 inches ............. 27.5 per cent
Reduction in area ................. 57.5 per cent This test showed that the fluidity of the weld is decreased by slightly increasing the carbon content of the welding rod above the usual range below 0.18 per cent. This decrease of fluidity involved no losses of tensile strength and ductility. Brittleness was not increased.

In another test of my discovery I used a core iron rod analyzing

| | Per cent |
|---|---|
| Carbon | 0.30 |
| Manganese | 0.65 |
| Silicon | less than 0.06 |
| Sulfur | less than 0.04 |
| Phosphorus | less than 0.04 |

In an all-weld metal specimen made in the overhead position, I obtained:

Specific gravity ........................... 7.85
Tensile strength .... 80,000 pounds per square inch
Elongation in 2 inches ............. 24.0 per cent
Reduction in area ................. 41.2 per cent In explanation of these results, it may be noted that heretofore an increase of the carbon content of iron welding electrodes above the 0.13 to 0.18 per cent range has always resulted in a deposited weld metal of increased hardness. Iron of increased carbon content has been used for depositing metal on rail surfaces to renew the surfaces and for similar hard surfacing purposes, but in this kind of electrode the core has always been of considerably higher carbon content than the range within which I have found that hardness and brittleness is not substantially increased. For hard surfacing welds the carbon test of the core wire should range above 0.40 per cent and may be as high as 1.0 per cent. The carbon range of from 0.20 to 0.30 per cent which I have found useful in preventing undue weld fluidity would be of no substantial benefit in producing a hard surface, and conversely, the range from 0.40 to 1.0 per cent carbon, as I have found, does not produce a satisfactory welding joint in vertical and overhead work. I have found that increasing the carbon content above 0.30 per cent increases the hardness of the deposited metal and correspondingly decreases the ductility, and this is unsatisfactory for the usual welded joint. A coated welding electrode having a core containing less than 0.20 per cent carbon has the disadvantage of producing undue welding fluidity.

In a specific embodiment of the present invention, a core iron rod ⅜ inch in diameter and containing 0.25 per cent carbon has a coating 1/16 inch thick made of a composition of iron oxid, manganese dioxid, silica flour, fluorspar, china clay and feldspar mixed together with sodium silicate or waterglass used as a binder. It is sometimes desirable to include in the mixture powdered metal such as iron, ferromanganese and ferro-silicon. Satisfactory coatings for welding electrodes are well known. This electrode is usually used in lengths of 14 to 18 inches and is bared on one end so that the electrode holder, which is connected electrically to one terminal of the welding machine, may be attached. The piece to be welded is electrically connected to the other terminal of the machine. The welding operation is started by touching the end of the electrode to the piece so that an arc forms, the core of the electrode melts and the mineral ingredients of the coating are melted and vaporized so as to form a shell or protecting layer of slag around the core metal of the electrode as it passes through the arc and deposits itself on the joint. In welding on vertical or overhead surfaces the mechanical procedure does not differ materially from downhand welding. Vertical welds are usually made starting from the bottom end of the seam and working upward, weaving the end of the electrode from side to side through one quarter or one half inch so as to spread the deposit as the work progresses. Working from the bottom up on vertical surfaces prevents the slag formed by the coating from too easily covering the parent metal ahead of the weld. On overhead surfaces, the direction of the work is not important but the electrode should be advanced in a side to side movement along the joint at a fairly rapid rate so that the amount of metal deposited at any one spot will not be too thick. When one layer of welding metal has been deposited, the brittle slag may be readily brushed off and successive layers added until the weld is complete.

As stated, the coated welding rod, containing about 0.25 per cent carbon, produces a clean, heat, homogeneous metal weld which does not run during the welding operation and which has high tensile strength and ductility—a sound weld being readily made. The new welding rod has the advantage of being almost equally available for overhead and vertical work and for flat work.

As illustrated in the above examples of core rod compositions which are shielded by protective coatings against atmospheric action during the welding operation, the core metal of the present invention consists of iron containing the usual or normal non-ferrous constituents and incidental impurities in a total amount of all such constituents well under four per cent of the metal, the core metal being thus, as disclosed in the examples, well over 96 per cent iron.

What I claim is:—

1. A welding electrode for use in the arc welding of iron and steel which comprises a core rod of iron containing from 0.2 to 0.3 per cent of carbon and less than a total of four per cent of non-ferrous constituents including incidental impurities, said rod being protected by a coating against atmospheric action during the welding, said electrode being adapted to effect vertical and overhead arc welding of iron and steel pieces without undue fluidity of the welding metal during the welding operation and to produce welds having high tensile strength and ductility.

2. In the improvement of arc welding electrodes made of a core iron metal usually containing less than 0.2 per cent carbon and over 96 per cent iron protected by a coating against atmospheric action during the welding operation, a method of decreasing the fluidity of the welding metal and preventing loss thereof during welding which comprises increasing the carbon content of the core metal to between 0.2 and 0.3 per cent.

JOHN H. DEPPELER.